(No Model.)

J. D. SHAUL.
DRAFT ADJUSTING STAY FOR VEHICLES.

No. 430,890. Patented June 24, 1890.

Attest:
J. Harris
N. R. Wheeler

Inventor:
John D. Shaul
per R. H. Pugh,
Attorney.

UNITED STATES PATENT OFFICE.

JOHN D. SHAUL, OF WILLIAMSBURG, IOWA.

DRAFT-ADJUSTING STAY FOR VEHICLES.

SPECIFICATION forming part of Letters Patent No. 430,890, dated June 24, 1890.

Application filed September 2, 1889. Serial No. 322,775. (No model.)

*To all whom it may concern:*

Be it known that I, JOHN D. SHAUL, a citizen of the United States, residing at Williamsburg, in the county of Iowa and State of Iowa, have invented a new and useful machine—the Central Draft-Adjusting Stay—for two-horse vehicles, of which the following is a specification.

My invention relates to improvements in the draft of vehicles by two horses by means of certain stay-rods, an equalizer, couplings, and adjusting-rods working upon a common center between the front axle and the whiffletrees of vehicles above or below the tongue; and the objects of my improvements are, first, to maintain a direct draft by the horses from the center of the bolt or pin in the center of the singletrees and ends of the doubletree; second, to adjust the draft equally between the horses; third, to stay the draft of one horse against the other beyond a point that would keep either singletree from grinding against or catching between the spokes of the front wheel of vehicle; fourth, to fix the draft of whiffletrees upon a center point in front of axle whether the draft on singletrees be equalized or stayed one against the other. I attain these objects in the mechanism illustrated in the accompanying drawings, in which—

Figure 1:
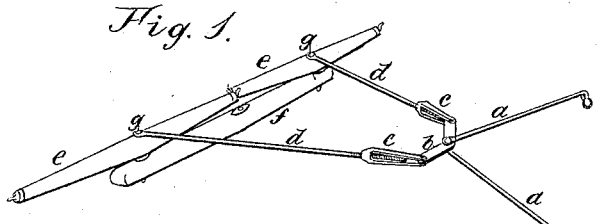
Figure 2:
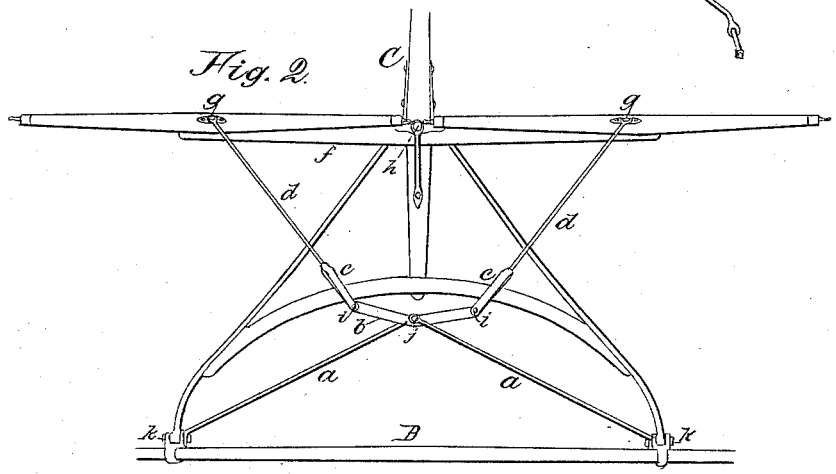
Figure 3:
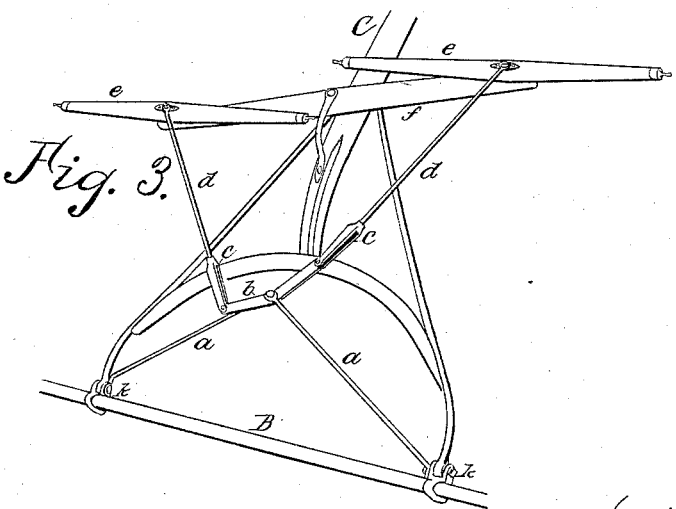

Figure 1 is a one-side view of the machine, showing the construction and bearings of the four different parts of the same. Fig. 2 is an entire view of the machine from the top, showing its attachment to the axle and whiffletrees and its position when draft is equal on each singletree. Fig. 3 is a top view of the machine and attachments when the draft on one singletree is stayed against the draft of the other to keep the backward singletree from the wheel of vehicle.

Similar letters refer to similar parts throughout the several views.

Two stay-rods $a\ a$ of five-sixteenths-inch iron or larger, according to the amount of draft and size of vehicle, and having one eye in front ends and one or two eyes in backward ends, are attached to axle B by one or more bolts and nuts at $k$, and meeting at their other ends, one above and the other below the flat-iron bar $b$ at a point opposite the center of vehicle from side to side, are fastened by the vertical bolt and nut $j$ through ends of rods and a hole in the center of bar $b$, and with axle B form a triangle. The horizontal equalizing-bar $b$ is of iron about one-fourth inch thick, one inch wide, and twelve inches long; but may be heavier or lighter, and is straight or slightly curved forward from center to ends and with the flat sides up and down. At each end of equalizing-bar $b$, at equal distances from its center bolt $j$, on which it bears, is a clevis-coupling $c\ c$ of flat iron, U-shaped, but form may be varied slightly, and fastened to bar $b$ by vertical rivets or bolts and nuts $i\ i$, on which the couplings and bar freely bear. The adjusting-rods $d\ d$ are iron about five-sixteenths inch thick, and are furnished with threads on one end and screw into the convex end of clevis-couplings $c\ c$ for two or more inches of their length for the purpose of lengthening or shortening the machine for use on different vehicles and to take up any slack caused by wear of its bearings, and thereby keeping the draft steady. At the other end these adjusting-rods are fastened by vertical bolts and nuts $g\ g$ through eyes in ends of rods and through hole in center of singletrees $e\ e$ and ends of doubletree $f$, bolts $g\ g$ forming free bearings for the parts they connect. Either end of doubletree $f$ is pulled backward by the opposite end being drawn forward, and either of the adjusting-rods $d\ d$ is pulled backward when the opposite end is pulled forward, and when both singletrees are pulled forward the draft on one singletree is from the middle of the bolt $g$ forward, while the opposite singletree pulls backward upon both ends of the bolt $g$, making the draft forward directly from the center of the bolt $g$. The equalizing-bar $b$ keeps the draft on each singletree equal in force until one singletree is so far ahead of the other as to draw bolts $g$ and $j$ and rivets $i\ i$ almost in a direct line, when the draft on the backward singletree is stayed, as in Fig. 3, and it cannot grind on the front wheel of vehicle or catch between its spokes. In this position all the draft is on the forward singletree and the vehicle will be drawn from center bolt $h$ in doubletree and center bolt $j$ directly back of it.

Figs. 2 and 3 show the machine as applied above the tongue C of vehicle. It may also be applied beneath the tongue with like effect.

Clevises with pins or bolts have been used to fasten singletrees on top of doubletrees, which produced a twisting draft of singletree from the upper half and head of bolt in clevis, and also stay-straps, chains, and rods have been used attached to axle at a point near hub of wheel and passing thence to end of doubletree or clevis on same, which produced a side draft of vehicle by stay. I do not claim such a combination, broadly; but What I do claim as my invention, and desire to secure by Letters Patent, is—

1. In the central draft-adjusting stay, the stay-rods $a$ $a$, attached to axle B, maintaining a direct draft therefrom and forming on center bolt $j$ a central bearing free from the tongue for equalizing-bar $b$, substantially as described.

2. In combination with the stay-rods $a$ $a$ and axle B, the equalizing-bar $b$ and clevis-couplings $c$ $c$, with their adjusting-rods $d$ $d$, attached to singletrees $e$ $e$, all substantially as set forth.

JOHN D. SHAUL.

Witnesses:
W. R. WHEELER,
J. HARRIS.